June 10, 1952  T. L. FAWICK  2,600,102
ROTATABLE SLIDE VALVE ASSEMBLY
Filed Oct. 3, 1946  3 Sheets-Sheet 1

THOMAS L. FAWICK
INVENTOR.

BY
Willard D. Eakin
ATTORNEY

INVENTOR.
THOMAS L. FAWICK
BY
Willard D. Eakin
ATTORNEY

THOMAS L. FAWICK
INVENTOR.

BY Willard D. Eakin
ATTORNEY

Patented June 10, 1952

2,600,102

UNITED STATES PATENT OFFICE 2,600,102

ROTATABLE SLIDE VALVE ASSEMBLY

Thomas L. Fawick, Cleveland, Ohio, assignor to The Fawick Airflex Company, Inc., a corporation of Indiana Application October 3, 1946, Serial No. 700,914

20 Claims. (Cl. 137—69)

This invention relates to valves adapted for charging and venting a rotary fluid-container while it is rotating, as in the case of a pneumatic tire or a fluid-actuated clutch or brake.

Its chief objects are to provide an improved valve assembly for that purpose; to provide a valve assembly comprising non-rotating sealing rings which will not be required to bear with high pressure against a rotary member except at such times as the pressure in the container is being increased or diminished, and thus to avoid rapid wearing out of such rings; to provide a valve assembly of this type requiring a space of only moderate length along the axis of the assembly; to provide dynamic balance, without counterbalancing of the rotary parts of the valve assembly; and to provide simplicity and economy of construction, assembly and repair.

Figure 1:
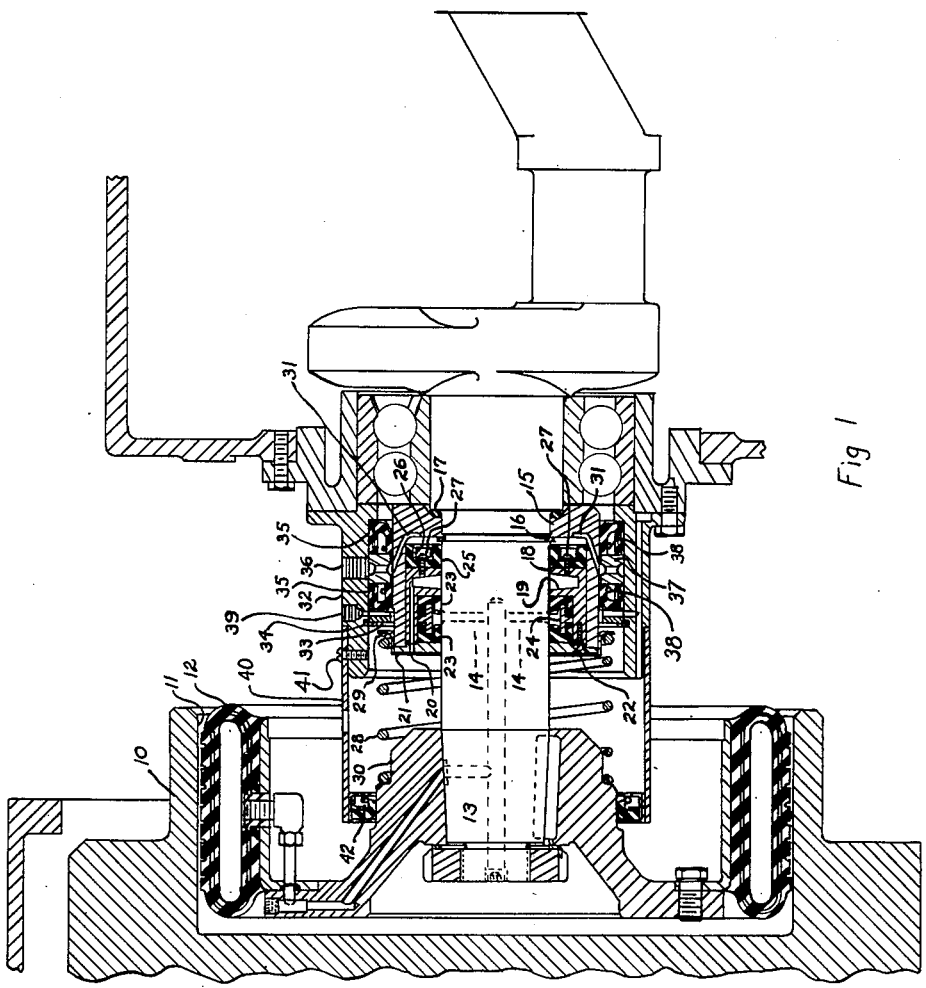
Fig. 1 is a vertical axial section of the preferred embodiment of my invention as applied to a clutch mechanism connecting the flywheel of a motor with the crank-shaft of an air-compressor.

Referring to the drawings, the assembly shown in Fig. 1 comprises the fly-wheel 10 of a motor, hollowed out to provide a cylindrical inner frictional-engagement face 11 adapted to be engaged by a clutch-bag 12 upon the distending of the bag by internal fluid pressure, the bag being mounted upon a clutch-hub 30 secured upon one end of the counterweighted crank-shaft 13 of an air compressor. The bag has communication, through a series of conduits as shown, with a circumferentially spaced set of radial holes 14, 14 extending inward, to a central bore, from the cylindrical outer surface of the shaft 13.

Mounted upon the shaft 13 and therewith defining an annular piston-chamber is a bell-shaped cylinder member 15 held with the radially inner margin of the inner face of its end-wall abutting a snap ring 16 mounted in an annular groove formed in the shaft. The member 15 is so held by a resilient ring 17, preferably of an oil-resistant synthetic rubber, the ring being pinched between the radially inner margin of the outer face of the end-wall of the member 15 and a shoulder formed on the shaft, and preferably with such pressure as to compel the cylinder member 15 to rotate with the shaft at all times when the shaft is rotating. My invention is not limited, however, to an assembly in which by this or other means the cylinder and shaft are always compelled to rotate together.

An annular piston structure is mounted in the cylinder 15 and surrounds the shaft, with a sliding fit of its metal parts against the shaft for wide-bearing guiding of the piston structure throughout its range of axial movement.

This piston structure comprises a bell-shaped metal member 18 having in the cylindrical inner face of its end-wall a deep annular groove 19 which is in communication with a circumferentially spaced set of exhaust passages such as the passage 20 which extend axially to the annular end face of the member 18 and are there in registry respectively with holes formed in annular end-plate 21 secured to the end of the member 18 by flat-headed screws such as the screw 22, the member 21, as above indicated, having a guiding slide fit upon the shaft.

The metal piston members 18 and 21 define an annular chamber surrounding the shaft and in this chamber are mounted a pair of transversely U-shaped sealing rings 23, 23 held in their seats by a slidably mounted metal ring 24, each of these rings being adapted to seal against the shaft and against the cylindrical inner face of the member 18, so that they serve as a trap-valve, to maintain the pressure in the container 12 when the piston structure is in such position that they are at opposite sides of the radial holes 14 in the shaft.

Mounted upon the outer face of the end-wall of the bell-shaped piston member 18 is a transversely U-shaped sealing ring 25 slidably sealing against the outer face of the shaft and the inner face of the cylinder member 15. The sealing lips of the ring 25, to hold them close to the metal members and to prevent the inner lip from being unduly distorted at times when there is preponderance of pressure in the radial passages 14 and the ring is at that position, are backed by a transversely U-shaped metal member 26, which, with the sealing ring, is secured to the end face of the piston member 18 by screws 27, 27.

For constantly urging the piston structure toward the right-hand, air-trapping position in which it is shown, a compression coil spring 28, surrounding and rotating with the shaft, is interposed between a stamped-metal spring seat 29, mounted on the end of the piston structure, and a shoulder formed on the clutch hub 30 on which the bag 12 is mounted.

For charging the right-hand end of the cylinder 15 and thus forcing the piston structure leftward, to selective positions determined by the amount of air-pressure developed in the cylinder, in opposition to the force of the spring 28, the cylinder is formed with numerous, inlet-outlet passages such as the two that are shown at 31, 31, through which the cylinder chamber is in communication with an annular chamber defined by the cylindrical outer surface of the cylinder member 15, an internally flanged housing member 32, and an annular end-plate 33 held in place by a snap-ring 34 mounted in an annular groove formed in the inner face of the housing member 32.

In the said annular chamber a pair of transversely U-shaped, non-rotating sealing rings 35, 35, held in their seats by an apertured metal ring 37, are interposed between the inner face of the housing member 32 and the outer face of the cylinder member 15, so that the chamber of the cylinder 15 is in constant closed communication with a coupling socket 36 formed in the wall of the housing member, through which, by suitable means (not shown) the cylinder can be vented, can be charged with air at such high pressure as to force the piston structure to its extreme leftward position, so that it abuts the hub member 30 and the cylinder chamber is in communication with the bag 12, or with air at such lower pressure as to hold the spring 28 in a less compressed condition, with the piston's exhaust ports 20 in communication with the bag, through the groove 19, for exhausting the bag and thus disengaging the clutch.

Preferably the inner annular lips of the non-rotating sealing rings 35 are at all times urged against the cylindrical outer face of the rotatable cylinder 15 by respective endless coil springs 38, 38, but only lightly, so that they are not quickly worn, being more strongly urged against the cylinder by internal air pressure only during the brief and infrequent times when the bag 12 is being charged or vented.

Suitable provision can be made, inclusive of an oil inlet 39, for lubricating the parts, and the structure as here shown comprises an oil retaining housing or guard member 40 secured at one end upon the housing member 32 by means of screws such as the screw 41, with an oil seal 42 interposed between its other end and the hub member 30.

In the operation of the slide-valve mechanism to engage the clutch, hold it engaged, and then disengage it, assuming the parts to be in the positions in which they are shown, but without distending pressure in the bag 12.

Air at full pressure is conducted into the cylinder 15, which forces the piston structure leftward until it is stopped by the hub member 30, thus opening communication from the cylinder 15 to the bag 12, through the radial passages 14 in the shaft.

Thus the bag 12 becomes fully charged and the clutch is engaged.

The cylinder 15 is then quickly vented to the atmosphere, through the numerous passages 31, which permits the spring 28 to move the piston structure quickly back to its farthest right-hand position, in which the rotating sealing rings 23 straddle the radial passages 14 and thus trap the high-pressure air in the bag 12. The radial passages 14 in the shaft preferably are of small dimension lengthwise of the shaft, and preferably are of less aggregate flow capacity than that of the numerous passages 31 through the wall of the cylinder, so that very little air escapes from the bag as the piston structure makes this quick movement to the right.

The shaft 13 then continues to be driven from the member 10 for such time as may be desired, with the sealing rings 23, 23 and 25 rotating with the shaft and consequently not being worn, and with the non-rotating sealing rings 35, 35 bearing only lightly, if at all, against the rotating cylinder 15, and thus not being subjected to substantial wear.

When the clutch is to be disengaged, air is admitted to the cylinder 15 as such pressure as to compress the spring 28 only to such extent that the vetn groove 19 is registered with the shaft's radial passages 14, and thus the bag 12 is vented to the atmosphere, after which the cylinder is vented to the atmosphere and, with only atmospheric pressure in the bag, the spring 28 is permitted to move the piston structure again to its right-hand position.

While the non-rotating sealing rings 35 are in engagement with the cylinder 15 at a greater radius than that of the engagement of the rotating sealing rings 23 with the shaft, the latter rings, while the clutch is engaged, are strongly urged against the shaft by the trapped air, whereas the non-rotating rings 35 are urged toward the cylinder only lightly by the endless springs 38, wherefore additional provision for compelling the cylinder 15 to rotate with the shaft is not indispensible.

The construction as shown and described provides the advantages that are set out in the above statement of objects and various modifications are possible without sacrifice of all of those advantages and without departure from the scope of the appended claims.

Figure 2:
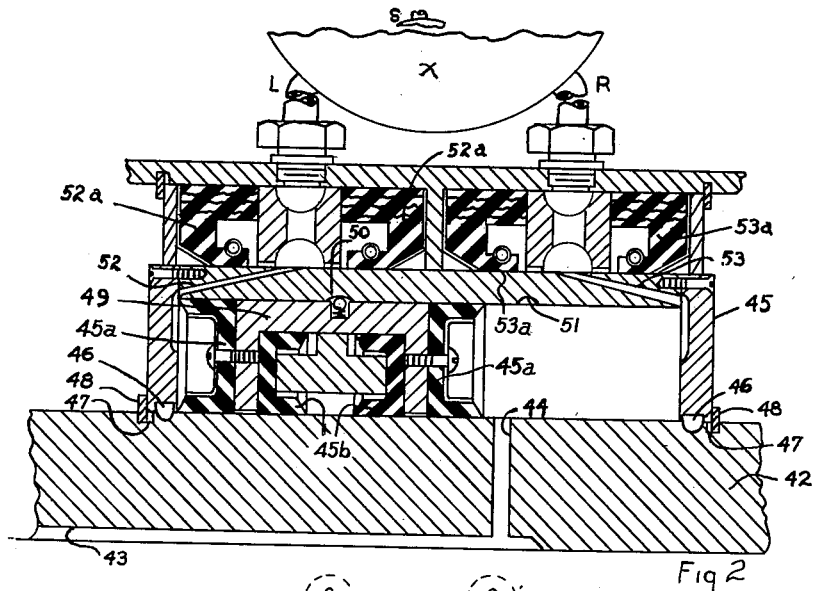
Fig. 2 is a similar section of a modification.

One such modification is shown in Fig. 2, in which a shaft 42 is formed with an axial bore 43 communicating with a circumferentially spaced set of radial holes 44, 44 opening on the cylindrical outer surface of the shaft.

Surrounding said surface is a double-action cylinder 45 which preferably is compelled to rotate with the shaft by keys 46, 46 and which at both of its ends is sealed to the shaft as by sealing rings 47, 47 backed by respective snap rings 48, 48.

Mounted in the cylinder is a two-way piston and valve structure 49, having lip-sealing rings 45a, 45a at its ends. The piston acts as a slide valve in relation to the radial holes 44, having a pair of lip-sealing rings 45b, 45b which in the rightward position of the structure close off the holes 44 against escape of air, with the entrapped air pressing the lips firmly against the shaft and thus resisting dislodgement of the structure from that position. The piston structure can be provided with a ball detent 50 and the inner face of the cylinder formed with a dimple 51 therefor, to augment such resistance if considered desirable.

The leftward position of the slide-valve-piston structure is such as to put the right-hand end of the cylinder chamber in direct communication with the radial holes 44.

The two ends of said chamber have communication, through respective sets of holes through the cylinder wall, such as the holes 52 and 53, with respective axially spaced-apart annular zones of the outer face of the cylinder and each of those zones is continuously straddled by a pair of non-rotating lip-sealing rings, shown at 52a, 52a and at 53a, 53a respectively.

The space between the rings 52a is in closed communication, through a pipe L, and the space between the rings 53a is in closed communication, through a pipe R, with a single control valve X having a supply pipe S leading from a source of pressure fluid.

Figure 3:
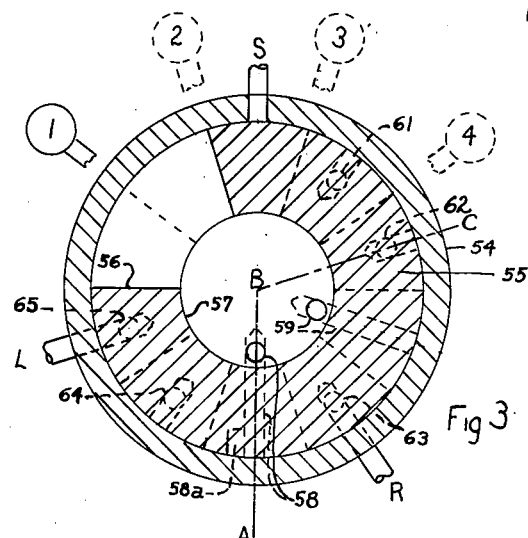
Fig. 3 is a cross-section of a control valve, on line 3—3 of Fig. 4.
Figure 4:
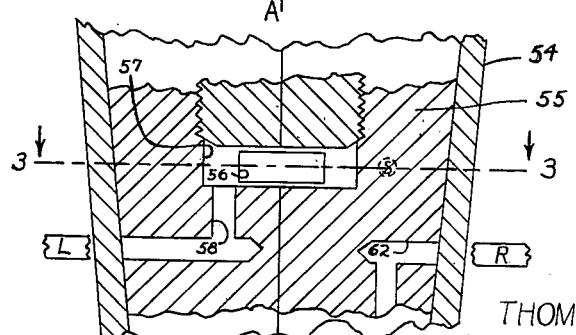
Fig. 4 is a section on line A—B—C of Fig. 3.

The control valve X, Fig. 2, comprises a valve casing 54, Figs. 3 and 4, and a tapered valve plug 55 therein having a large inlet port 56 in its side face, equal in arcuate length to two step movements of the plug, this large port leading to a central chamber 57 from which two suitably spaced passages 58 and 59 lead downward to a lower level at which the pipes L and R are coupled to the valve casing, and then outward to the face of the plug, the spacing being such that the passage 59 will be registered with the port of the pipe R at the end of the first clockwise movement of the plug and the passage 58 will be registered with the port L at the end of the second such movement.

The plug is also formed, at the low level of the pipes L and R, with five suitably spaced vent passages 61, 62, 63, 64 and 65, and their spacing is such that in the neutral, shut-off position of the plug, shown in full lines in Fig. 3, vent passage 65 will be registered with pipe L and vent passage 63 will be registered with pipe R, with the supply of pressure fluid shut off by the plug as there shown.

The construction, as is clearly shown in Figs. 3 and 4, is such that in a succession of three step movements of the plug clockwise from the neutral or starting position shown in Fig. 3, followed by three step movements counterclockwise back to starting position, the following sequence will occur in each full cycle of operation:

1. Starting position, R and L vented, clutch disengaged;
2. End of first movement, R charged and L vented, clutch engaged;
3. End of second movement, R vented and L charged, air trapped;
4. End of third movement, R and L vented, clutch remaining engaged and sealing rings 52a and 53a relieved of fluid pressure;
3. End of first movement, R vented and L charged, no movement of valve, air still trapped;
2. End of second return movement, R charged and L vented, valve opened;
1. End of third return movement, R and L vented, clutch disengaged.

The first return movement, putting the plug back to position 3, is non-functional, but is a harmless incident of the arrangement for forward movement for engaging the clutch and return movement for disengaging it, which provides simple, small arc, forward and back operation of the control handle.

While the forward movement and the reverse movement have been treated, for clarity, as each consisting of a series of step movements, in actual practice a single forward movement from position 1 to position 4 engages the clutch and relieves the rings 52a, 53a, and a single return movement from position 4 to position 1 disengages the clutch, relieves the rings and shuts off the pressure-fluid supply.

For quick movement of the slide-valve to the air-trapping position (second part of the clutch setting movement of the plug, to position 3), so that there will be but little escape of air through the pipe R, provision may be made for charging the pipe L a little before the pipe R is vented, as by forming the plug with a lateral extension 58a of the mouth of the passage 58.

Figure 5:
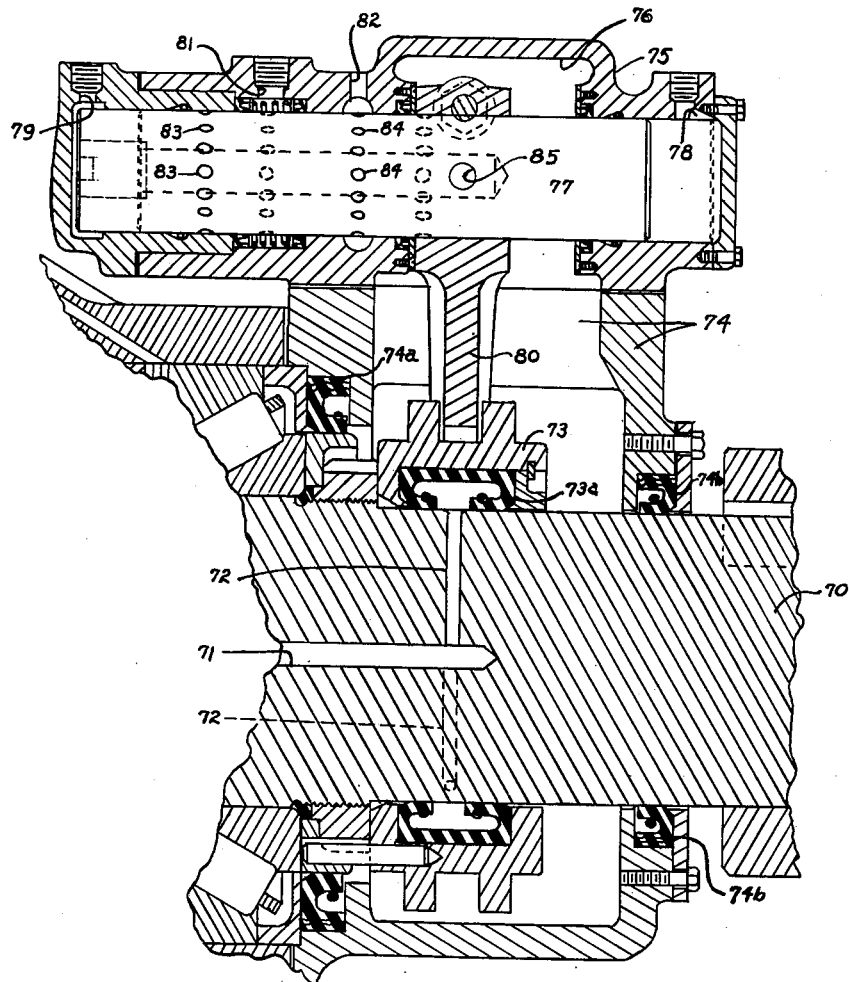
Fig. 5 is a vertical axial section of another modification.

Fig. 5 shows another embodiment of the invention in its broader aspect. The assembly there shown comprises a shaft 70 having an axial passage 71 communicating, through radial passages 72, 72, with the outer face of the shaft.

A slide-valve 73 is mounted on the shaft for covering and uncovering the holes 72 and this slide valve is contained in an annular chamber which is defined by the shaft, a non-rotating hollow annular member 74 and a non-rotating cylinder member 75 mounted upon the member 74.

The cylinder member 75 has a middle cavity 76 which is in communication with the interior of the member 74. Bridging this cavity and slidably mounted in the cylinder at each side of the cavity 76 is a plunger-type piston 77 adapted to be forced leftwardly by air admitted to the right-hand end of the cylinder through a port 78 and to be forced in the opposite direction by air admitted to the left-hand end of the cylinder through a port 79.

A shifter arm 80 is mounted upon the piston 77 and extends at right-angles therefrom into an annular groove in the outer face of the slide valve 73 for effecting axial movement of the valve while it is or is not rotating with the shaft 70.

The slide valve 73 has a gasket 73a which seals against the shaft 70 and always rotates when the shaft is rotating, so that it is not subjected to rapid wear.

The member 74 is provided with gaskets 74a and 74b which are pressed by the air pressure against rotating members only during the short times when air is being forced into the shaft, so that they also are not subjected to rapid wear.

The piston 77 coacts as a slide valve with the cylinder member 75 for charging and venting the chamber within the member 74, in proper sequence with relation to its moving the slide valve 73 for opening and closing the radial ports 72, for charging and venting the shaft 70, and the piston 77 coacts as a slide valve with the cylinder member 75 for exhausting the chamber within the member 74, through the exhaust port 82 and thus relieving the sealing rings 74a and 74b, when the slide valve 73 is in port-closing position for trapping the air in the shaft.

The ports for such slide-valve action are an inlet and outlet port 81 in the cylinder wall, an exhaust port 82 axially spaced therefrom, and, in the piston, radial ports 83, 83, 84, 84 and 85 suitably spaced axially of the piston with relation to the cylinder ports 81 and 82 and the wall of the cylinder casing through which the piston extends into the latter's middle cavity 76.

The spacing is such that the operation of the assembly is as follows:

The ports being in the positions in which they are shown and the shaft 70 containing air at only atmospheric pressure, the radial passages 72 are opened by admitting air to the cylinder 75 through the port 79. This brings the ports 83 into registry with the annular groove extending from the port 81 and brings the ports 84 inside of the cylinders middle chamber 76.

The shaft is then charged by admitting air to it by way of the ports 81, 83, 84, 85 and 72.

While the pressure is still on the piston 77 is returned to its leftward position by air admitted through the port 78, which traps the air in the shaft and immediately thereafter relieves the sealing rings 74a, 74b by exhausting the chamber 76 through the ports 85 and 82.

For relieving the pressure in the shaft 70, the piston is moved to its rightward position, as for charging, but the port 81 is now used as an exhaust for air entering the piston through the ports 84 and 85, after which, if desired, the piston can be returned to its leftward position, with only atmospheric pressure in the shaft.

I claim:

1. A valve assembly comprising a rotary member formed with a cylindrical outer surface and a fluid passage extending inward therefrom, the axis of rotation being the axis of its cylindrical outer face, an annular slide valve structure mounted on, surrounding and rotatable with said surface for opening and closing said passage, non-rotating means for moving said valve structure on said surface for opening and closing said passage during rotation of said member and said valve, and means inclusive of rotative and non-rotative members defining a conduit for forcing fluid through said passage into the first said member when said passage is not closed by the slide valve structure.

2. A valve assembly comprising a rotary member formed with a cylindrical outer surface and a fluid passage extending inward therefrom, the axis of its rotation being the axis of its cylindrical outer face, an annular slide valve structure mounted on, surrounding and rotatable with said surface for opening and closing said passage, non-rotating means for moving said valve structure on said surface for opening and closing said passage during rotation of said member and said valve, means inclusive of rotative and non-rotative members defining a conduit for forcing fluid through said passage into the first said member when said passage is not closed by the slide valve structure, and means for temporarily effecting a seal between said rotative and non-rotative members at such times.

3. A valve assembly comprising a rotary member formed with a cylindrical outer surface and a fluid passage extending inward therefrom, the axis of its rotation being the axis of its cylindrical outer face, an annular slide valve structure mounted on, surrounding and rotatable with said surface for opening and closing said passage, non-rotating means for moving said valve structure on said surface for opening and closing said passage during rotation of said member and said valve, means inclusive of rotative and non-rotative members defining a conduit for forcing fluid through said passage into the first said member when said passage is not closed by the slide valve structure, and lip-sealing means for effecting a seal between said rotative and non-rotative members.

4. A valve assembly comprising a rotary member formed with a cylindrical outer surface and a fluid passage extending inward therefrom, a fluid-pressure cylinder surrounding and rotatable with said member, and with said surface defining an annular piston chamber, a slide valve structure mounted in said chamber as an annular piston for opening and closing said passage, means inclusive of non-rotating conducting means for supplying pressure fluid to one end of said chamber during rotation of said member and cylinder, to move said slide-valve-piston structure in one direction, and means for moving it in the other direction during such rotation.

5. A valve assembly comprising a rotary member formed with a cylindrical outer surface and a fluid passage extending inward therefrom, a fluid-pressure cylinder surrounding and rotatable with said member, and with said surface defining an annular piston chamber, a slide valve structure mounted in said chamber as an annular piston for opening and closing said passage, means inclusive of non-rotating conducting means for supplying pressure fluid to one end of said chamber during rotation of said member and cylinder, to move said slide-valve-piston structure in one direction, and means rotating with the member and cylinder for moving it in the other direction during such rotation.

6. A valve assembly comprising a rotary member formed with a cylindrical outer surface and a fluid passage extending inward therefrom, a fluid-pressure cylinder surrounding and rotatable with said member, and with said surface defining an annular piston chamber, a slide valve structure mounted in said chamber as an annular piston for opening and closing said passage, means inclusive of non-rotating conducting means for supplying pressure fluid to one end of said chamber during rotation of said member and cylinder, to move said slide-valve-piston structure in one direction, and a return spring rotating with the member and cylinder for moving it in the other direction during such rotation.

7. A valve assembly comprising a rotary member formed with a cylindrical outer surface and a fluid passage extending inward therefrom, a slide valve structure mounted on and rotatable with said surface for opening and closing said passage, and means for moving said valve structure on said surface for opening and closing said passage during rotation of said member and said valve, said slide valve structure being formed with passages for putting the aforementioned passage in communication selectively with a source of pressure fluid and with the atmosphere.

8. A valve assembly comprising a rotary member formed with a cylindrical outer surface and a fluid passage extending inward therefrom, a fluid-pressure cylinder surrounding and rotatable with said member and with said surface defining an annular piston chamber, a slide valve structure mounted in said chamber as an annular piston for opening and closing said passage, means inclusive of non-rotating conducting means for supplying pressure fluid to one end of said chamber during rotation of said member and cylinder, to move said slide-valve-piston structure in one direction, and means for moving it in the other direction during such rotation, said slide-valve-piston structure being movable to a position such as to put said end of said chamber in direct communication with said passage.

9. A valve assembly comprising a rotary member formed with a cylindrical outer surface and a fluid passage extending inward therefrom, a slide valve structure mounted on and rotatable with said surface for opening and closing said passage, and means for moving said valve structure on said surface for opening and closing said passage during rotation of said member and said valve, the assembly including a non-rotating structure surrounding said slide valve structure and therewith defining an annular fluid-conducting chamber.

10. A valve assembly comprising a rotary member formed with a cylindrical outer surface and a fluid passage extending inward therefrom, a fluid-pressure cylinder surrounding and rotatable with said member, and with said surface defining an annular piston chamber, a slide valve structure mounted in said chamber as an annular piston for opening and closing said passage, means inclusive of non-rotating conducting means for supplying pressure fluid to one end of said chamber during rotation of said member and cylinder, to move said slide-valve-piston structure in one direction, and a return spring rotating with the member and cylinder for moving it in the other direction during such rotation, the slide-valve-piston structure being formed with a passage extending from the atmosphere and registerable with the first mentioned passage.

11. A valve assembly comprising a rotary member formed with a cylindrical outer surface and a fluid passage extending inward therefrom, a slide valve structure mounted on and rotatable with said surface for opening and closing said passage, and means for moving said valve structure on said surface for opening and closing said passage during rotation of said member and said valve, said slide valve structure including means which with said cylindrical surface define an annular chamber and, mounted in said chamber, deformable sealing means rotatable with said member and comprising sealing lips positionable in straddling relation to said passage.

12. A valve assembly comprising a rotary member formed with a cylindrical outer surface and a fluid passage extending inward therefrom, a double-action fluid-pressure cylinder surrounding and rotatable with said member, and with said surface defining an annular piston chamber, a slide valve structure mounted in said chamber as a two-way annular piston for opening and closing said passage, non-rotating conducting means for supplying pressure fluid to one end of said chamber during rotation of said member and cylinder, to move said slide-valve-piston structure in one direction, and non-rotating conducting means for supplying pressure fluid to the other end of said chamber to move said structure in the other direction during such rotation.

13. A valve assembly comprising a rotary member formed with a cylindrical outer surface and a fluid passage extending inward therefrom, a double-action fluid-pressure cylinder surrounding and rotatable with said member, and with said surface defining an annular piston chamber, a slide-valve structure mounted in said chamber as a two-way annular piston for opening and closing said passage, non-rotating conducting means for supplying pressure fluid to one end of said chamber during rotation of said member and cylinder, to move said slide-valve-piston structure in one direction, non-rotating conducting means for supplying pressure fluid to the other end of said chamber to move said structure in the other direction during such rotation, and a single control valve interposed operatively between the two said conducting means, in selective relation thereto, and a single source of pressure fluid, the control valve also having venting means, and being so constructed as to provide, in each cycle, a sequence inclusive of the following, in order, R representing one end of the cylinder chamber and L the other:

R and L vented;
R charged and L vented;
R vented and L charged;
R and L vented;
R charged and L vented;
R and L vented.

14. A valve assembly comprising a rotary member formed with a cylindrical outer surface and a fluid passage extending inward therefrom, a double-action fluid-pressure cylinder surrounding and rotatable with said member, and with said surface defining an annular piston chamber, a slide valve structure mounted in said chamber as a two-way annular piston for opening and closing said passage, non-rotating conducting means for supplying pressure fluid to one end of said chamber during rotation of said member and cylinder, to move said slide-valve-piston structure in one direction, and non-rotating conducting means for supplying pressure fluid to the other end of said chamber to move said structure in the other direction during such rotation, each of said conducting means comprising a pair of non-rotating annular seals coacting with the other face of the cylinder, and the two ends of the cylinder having communication respectively with the spaces between the two pairs of seals.

15. A valve assembly comprising a rotary member formed with a cylindrical outer surface and a fluid passage extending inward therefrom, a slide valve structure mounted on and rotatable with said surface for opening and closing said passage, and means including a non-rotating mechanical shifter for moving said valve structure on said surface for opening and closing said passage during rotation of said member and said valve.

16. A valve assembly comprising a rotary member formed with a cylindrical outer surface and a fluid passage extending inward therefrom, a slide valve structure mounted on and rotatable with said surface for opening and closing said passage, a non-rotating cylinder and piston assembly, and a mechanical shifter actuated by said assembly for shifting the slide valve.

17. A valve assembly comprising a rotary member formed with a cylindrical outer surface and a fluid passage extending inward therefrom, a slide valve structure mounted on and rotatable with said surface for opening and closing said passage, a non-rotating cylinder and piston assembly, and a mechanical shifter actuated by said assembly for shifting the slide valve, the combination including non-rotating means which with said cylinder and piston assembly and said rotary member define an annular chamber surrounding said slide valve structure and said rotary member, and the piston and cylinder being formed with registerable ports for changing the fluid pressure in said chamber.

18. A valve assembly comprising a rotary member formed with a cylindrical outer surface and a fluid passage extending inward therefrom, a slide valve structure mounted on and rotatable with said surface for opening and closing said passage, a non-rotating cylinder and piston assembly, and a mechanical shifter actuated by said assembly for shifting the slide valve, the combination including non-rotating means which with said cylinder and piston assembly and said rotary member define an annular chamber surrounding at least one end of said slide valve structure. and the piston and cylinder being formed with registerable ports for changing the fluid pressure in said chamber.

19. A valve assembly comprising a rotary member having a cylindrical outer face concentric with its axis of rotation and formed with a fluid passage extending inward from said face, non-rotative means which with said face defines an annular chamber surrounding said member, non-rotative means for charging and venting said member, a slide valve in said chamber for closing and opening said passage by moving axially of the member, and non-rotative means for so moving said slide valve.

20. A valve assembly comprising a rotary member having a cylindrical outer face concentric with its axis of rotation and formed with a fluid passage extending inward from said face, non-rotative means which with said face defines an annular chamber surrounding said member, non-rotative means for charging and venting said chamber, a slide valve in said chamber for closing and opening said passage by moving axially of the member, and non-rotative means for so moving said slide valve, the slide valve being annular and having self-energizing sealing means for effecting annular seals against the rotary member at each side of the said passage.

THOMAS L. FAWICK.

REFERENCES CITED

The following references are of record in the file of this patent:

UNITED STATES PATENTS

| Number | Name | Date |
|---|---|---|
| 2,242,184 | Reuter | May 13, 1941 |
| 2,258,094 | Keller | Oct. 7, 1941 |
| 2,310,309 | Orr | Feb. 9, 1943 |
| 2,354,174 | Schmitter | July 18, 1944 |
| 2,354,791 | Boldt | Aug. 1, 1944 |
| 2,485,692 | Brill | Oct. 25, 1949 |